United States Patent
Akirav et al.

(10) Patent No.: US 9,361,189 B2
(45) Date of Patent: *Jun. 7, 2016

(54) OPTIMIZING DISASTER RECOVERY SYSTEMS DURING TAKEOVER OPERATIONS

(71) Applicant: INTERNATIONAL BUSINESS MACHINES CORPORATION, Armonk, NY (US)

(72) Inventors: Shay H. Akirav, Petach-Tikva (IL); Aviv Caro, Modiin (IL); Itay Maoz, Haifa (IL); Gil E. Paz, Yehud (IL); Uri Shmueli, Ganei Tikva (IL); Tzafrir Z. Taub, Ness Ziona (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/613,582

(22) Filed: Feb. 4, 2015

(65) Prior Publication Data
US 2015/0242287 A1    Aug. 27, 2015

Related U.S. Application Data

(63) Continuation of application No. 13/775,837, filed on Feb. 25, 2013, now Pat. No. 8,959,391, which is a continuation of application No. 13/099,282, filed on May 2, 2011, now Pat. No. 8,671,308.

(51) Int. Cl.
*G06F 11/00* (2006.01)
*G06F 11/14* (2006.01)
(Continued)

(52) U.S. Cl.
CPC ........ *G06F 11/1464* (2013.01); *G06F 11/1451* (2013.01); *G06F 11/1456* (2013.01);
(Continued)

(58) Field of Classification Search
CPC ............ G06F 11/1464; G06F 11/1451; G06F 11/1456; G06F 11/2033; G06F 11/2094
See application file for complete search history.

(56) References Cited

U.S. PATENT DOCUMENTS

| 5,555,404 A | 9/1996 | Torbjornsen et al. |
| 5,592,618 A | 1/1997 | Micka et al. |

(Continued)

FOREIGN PATENT DOCUMENTS

| CN | 101217292 A | 7/2008 |
| CN | 101635638 A | 1/2010 |
| WO | 2011014167 A1 | 2/2011 |

OTHER PUBLICATIONS

"IBM TSB Disaster Recovery Best Practices with EMC Data Domain De-duplication Storage," EMC, Dec. 2010 (17 pages).

(Continued)

*Primary Examiner* — Michael Maskulinski
(74) *Attorney, Agent, or Firm* — Griffiths & Seaton PLLC

(57) ABSTRACT

Exemplary method, system, and computer program product embodiments for optimizing disaster recovery systems during takeover operations are provided. In one embodiment, by way of example only, a flag is set in a replication grid manager to identify replication grid members to consult in a reconciliation process for resolving intersecting and non-intersecting data amongst the disaster recovery systems for a takeover operation. Additional system and computer program product embodiments are disclosed and provide related advantages.

7 Claims, 10 Drawing Sheets

(51) Int. Cl.
*G06F 11/20* (2006.01)
*G06F 17/30* (2006.01)

(52) U.S. Cl.
CPC ........ *G06F11/2033* (2013.01); *G06F 11/2094* (2013.01); *G06F 17/30575* (2013.01); *G06F 2201/82* (2013.01)

(56) References Cited

U.S. PATENT DOCUMENTS

| | | |
|---|---|---|
| 6,317,814 B1 | 11/2001 | Blendermann et al. |
| 7,171,532 B2 | 1/2007 | Kodama |
| 7,222,172 B2 | 5/2007 | Arakawa et al. |
| 7,243,103 B2 | 7/2007 | Murphy et al. |
| 7,392,421 B1 | 6/2008 | Bloomstein et al. |
| 7,475,280 B1 | 1/2009 | Schlomer et al. |
| 7,577,868 B2 | 8/2009 | Aidun |
| 7,657,578 B1 | 2/2010 | Karr et al. |
| 7,689,759 B2 | 3/2010 | Bello et al. |
| 7,778,986 B2 | 8/2010 | Bish et al. |
| 7,802,126 B2 | 9/2010 | Johnson |
| 7,870,105 B2 | 1/2011 | Arakawa et al. |
| 7,899,895 B2 | 3/2011 | Bish et al. |
| 7,934,116 B2 | 4/2011 | Mehrdad |
| 8,327,186 B2 | 12/2012 | Coatney et al. |
| 8,850,139 B2 | 9/2014 | Akirav et al. |
| 8,892,830 B2 | 11/2014 | Akirav et al. |
| 8,959,391 B2 | 2/2015 | Akirav et al. |
| 2003/0120676 A1 | 6/2003 | Holavanahalli et al. |
| 2003/0126107 A1 | 7/2003 | Yamagami |
| 2004/0153614 A1 | 8/2004 | Bitner et al. |
| 2005/0193235 A1 | 9/2005 | Sandorfi et al. |
| 2005/0283641 A1 | 12/2005 | Clark et al. |
| 2006/0075005 A1 | 4/2006 | Kano et al. |
| 2006/0090095 A1 | 4/2006 | Massa et al. |
| 2006/0200506 A1 | 9/2006 | Desimone et al. |
| 2006/0294164 A1 | 12/2006 | Armangau et al. |
| 2006/0294305 A1 | 12/2006 | Ballard et al. |
| 2008/0243860 A1 | 10/2008 | Cannon et al. |
| 2009/0055689 A1 | 2/2009 | Petersen |
| 2009/0063487 A1 | 3/2009 | Bish et al. |
| 2009/0063668 A1 | 3/2009 | Bish et al. |
| 2009/0119452 A1 | 5/2009 | Bianchi |
| 2009/0271658 A1 | 10/2009 | Aidun |
| 2009/0282203 A1 | 11/2009 | Haustein et al. |
| 2010/0031080 A1 | 2/2010 | Shangguan |
| 2010/0228916 A1 | 9/2010 | Massey et al. |
| 2010/0293349 A1 | 11/2010 | Lionetti et al. |
| 2011/0010498 A1 | 1/2011 | Lay et al. |
| 2011/0040728 A1 | 2/2011 | Akirav et al. |
| 2011/0040942 A1 | 2/2011 | Akirav et al. |
| 2011/0066799 A1 | 3/2011 | Gold |
| 2011/0161723 A1 | 6/2011 | Taleck et al. |
| 2012/0089570 A1 | 4/2012 | Zha et al. |
| 2012/0089866 A1 | 4/2012 | Akirav et al. |
| 2012/0096306 A1 | 4/2012 | Akirav et al. |
| 2012/0101990 A1 | 4/2012 | Holenstein et al. |
| 2012/0123999 A1 | 5/2012 | Ashutosh et al. |
| 2012/0124012 A1 | 5/2012 | Provenzano et al. |
| 2012/0124013 A1 | 5/2012 | Provenzano |
| 2012/0124014 A1 | 5/2012 | Provenzano |
| 2012/0124046 A1 | 5/2012 | Provenzano |
| 2012/0124105 A1 | 5/2012 | Provenzano |
| 2012/0124306 A1 | 5/2012 | Abercrombie et al. |
| 2012/0191663 A1 | 7/2012 | Blitzer et al. |
| 2012/0221529 A1 | 8/2012 | Rosikiewicz et al. |
| 2012/0221818 A1 | 8/2012 | Akirav et al. |
| 2012/0233123 A1 | 9/2012 | Shiseng et al. |
| 2012/0239974 A1 | 9/2012 | Akirav et al. |
| 2012/0284555 A1 | 11/2012 | Akirav et al. |
| 2012/0284556 A1 | 11/2012 | Akirav et al. |
| 2012/0284559 A1 | 11/2012 | Akirav et al. |

OTHER PUBLICATIONS

"Understanding the HP Data Deduplication Strategy," Hewlett-Packard, Jul. 2009 (28 pages).
FalconStor Software, "Virtual Tape Library (VTL) Appliances," 2007 (2 pages).
"HP Storage Works D2D Backup Systems—Overview and Features," http://www.hp.com/cgi-bin/pf-new-cgi?IN=http%3A%2F%2Fh10010.ww . . . .en/sm/WF05a/12169-304616-3755723-3755723-3755723-3896393.html, Hewlett-Packard Development Co., 2011 (2 pages).
Nobuhiro Maki et al., "A Proposal of Management Interface for Differential Data Exchange Mechanism on 3 Datacenter Storage Systems," IEEE, 978-1-4244-3388-9/09, 2009 (4 pages).
David Hill, "FalconStor Heats up VTL Deduplication and the Data Deduplication War," PUND-IT, Inc., Weekly Review, vol. 5, Issue 27, Jun. 3, 2009 (5 pages).

OPTIMIZING DISASTER RECOVERY SYSTEMS DURING TAKEOVER OPERATIONS

CROSS REFERENCE TO RELATED APPLICATIONS

This application is a Continuation of U.S. patent application Ser. No. 13/775,837, filed on Feb. 25, 2013, which is a Continuation of U.S. patent application Ser. No. 13/099,282, filed on May 2, 2011, the contents of both of which are hereby incorporated by reference in their entirety.

FIELD OF THE INVENTION

The present invention relates in general to computers, and more particularly to optimizing disaster recovery systems during takeover operations in a computing storage environment.

DESCRIPTION OF THE RELATED ART

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components.

Virtual storage components are found in a variety of computing environments. A typical virtual storage component is the magnetic tape cartridge used via a magnetic tape drive. Multiple tape drives may be contained in a tape library, along with several slots to hold tape cartridges. Such data storage systems utilize storage components (usually direct access storage, such as disk arrays) to virtually present tape libraries or tape drives. Both types of technologies are commonly used for backup and recovery purposes. Virtual tape libraries, which integrate with existing backup software and existing backup and recovery processes, enable typically faster backup and recovery operations. It is often required that such data storage entities be replicated from their origin site to remote sites. Replicated data systems may externalize various logical data storage entities, such as files, data objects, backup images, data snapshots or virtual tape cartridges.

Replicated data entities enhance fault tolerance abilities and availability of data. Thus, it is critical to create disaster recovery (DR) plans for these massive computer systems, particularly in today's global economy. DR plans are required by variable sized companies and by governments in most of the western world. Most modern standards denote a 3-4 sites (many-to-many) topology group for replicating data between the storage systems in order to maintain 3 to 4 copies of the data in the storage systems.

SUMMARY OF THE INVENTION

As previously mentioned, modern standards typically denote a 3-4 sites (many-to-many) topology group for replicating data between the storage systems in order to maintain three to four copies of the data in the storage systems. Within the many-to-many topologies, challenges arise in assuring takeover processes, which are apart of the disaster recovery (DR) plan, avoid creating situations that reduce productivity and efficiencies. Such challenges include preventing possible data corruption scenarios, particularly when involving synchronization processes between multiple interlaced systems, and/or situations where users end up with wrong cartridges at a particular production site. Such inefficiencies reduce performance and may compromise the integrity of maintaining copies of data within a storage system.

Accordingly, and in view of the foregoing, various exemplary method, system, and computer program product embodiments for optimizing disaster recovery systems during takeover operations are provided. In one embodiment, by way of example only, a flag is set in a replication grid manager to identify replication grid members to consult in a reconciliation process for resolving intersecting and non-intersecting data amongst the disaster recovery systems for a takeover operation.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
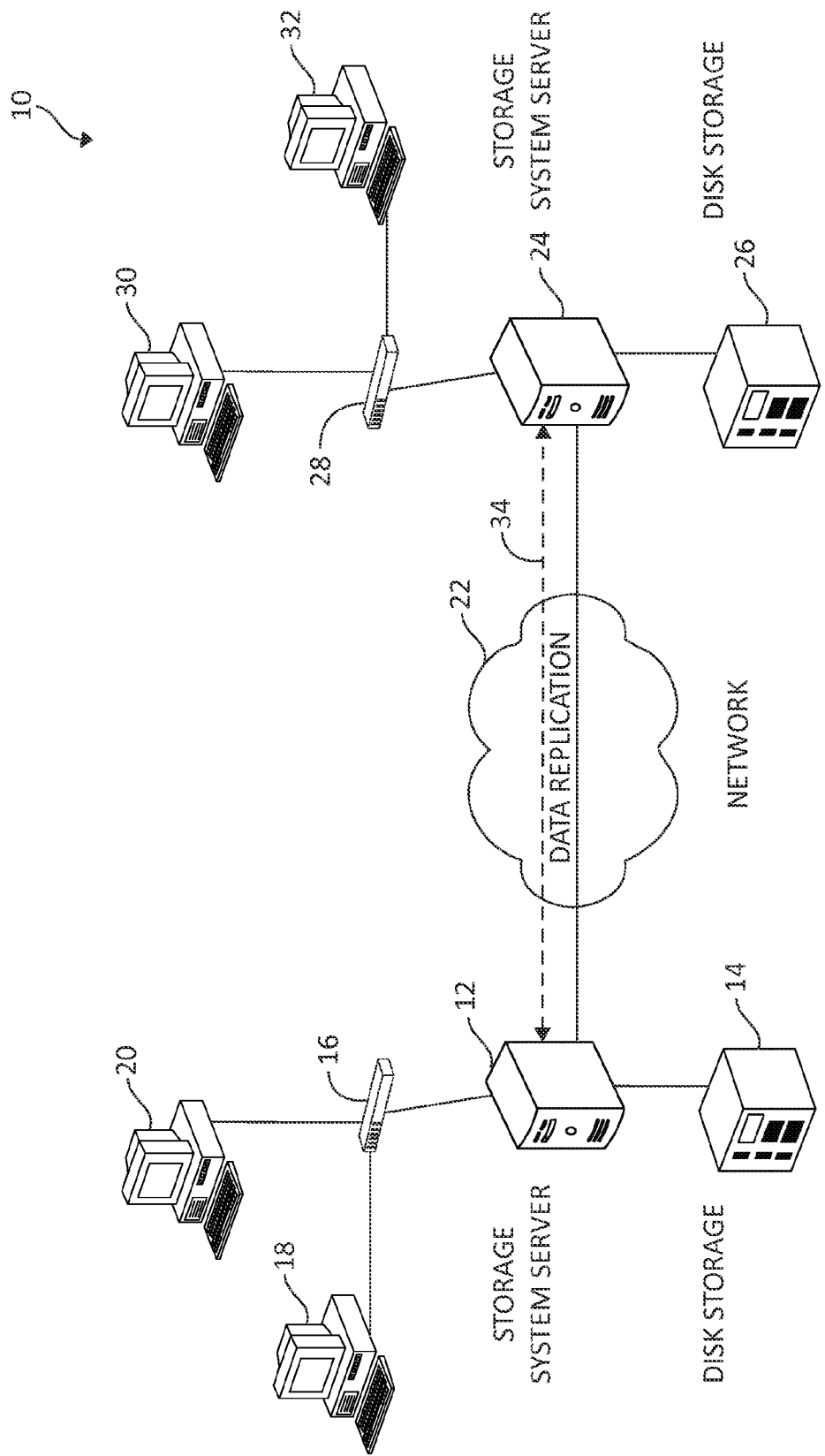
FIG. 1 illustrates an exemplary computing environment in which aspects of the present invention may be implemented.

Throughout the following description and claimed subject matter, the following terminology, pertaining to the illustrated embodiments, is described.

A "cartridge ownership" is intended to refer to an attribute of a cartridge that indicates the cartridge's ability to be written at a certain system. A cartridge may be write-enabled on its owner system. A "change ownership protocol" is intended to refer to the communication means in which a replication grid manager uses in order to coordinate a waiver of ownership at a source system and the gaining of ownership at a target system. A "change ownership source" is intended to refer to a virtual tape library system waving ownership of a set of its cartridges. A "change ownership target" is intended to refer to a virtual tape library system gaining ownership of a set of cartridges.

A "disaster recovery (DR) mode" is intended to refer to an indication at a remote system that a certain remote system is now used as DR for a certain source system. The DR mode may cause replication communication from the source system to be blocked in order to protect replicated data. A "replication" is intended to refer to a process of incrementally copying deduplicated data between systems, which reside in the same replication grid. A "replication grid" is intended to refer to a logical group, which provides context in which replication operation may be established between different physically connected members. A "replication grid manager" is intended to refer to a component (such as a software component operated by a processor device) in charge of replication and changing ownership activity in a grid's context. A "VTL" or "virtual tape library" is intended to refer to a virtual tape library—computer software emulating a physical library.

A "cartridge" may include the term data storage entity, data storage entities, replicated data storage entity, replicated data storage entities, files, data objects, backup images, data snapshots, virtual tape cartridges, and other known art commonly known in the industry as a cartridge in a computer environment. Also, a source system site may refer to a first storage system, first storage site, and primary storage system. A remote system site may be referred to as a secondary storage site, a secondary storage system, and a remote storage system.

The many-to-many topology may create problems for one-to-one and many-to-one topologies. When different data sets or multiple intersecting data sets are being replicated from a source site to different destinations, the normal disaster recovery process should recover from multiple sites, and in case of intersection, should be recovered only on one of the destinations (the one that has its backup environment production ownership).

Such problems are not covered by standard replication solutions. Hence, using any solution would result in shutdown of the DR system for a number of source systems that might be in the midst of replication and thereby fail to prevent the possible pit falls which may result in data loss/corruption and/or prolonged RPO (Recovery Point Objective).

In contrast, and to address the inefficiencies and performance issues previously described, the mechanisms of the illustrated embodiments serve to optimize the disaster recovery systems during takeover operations in a more effective manner, for example, in a many to many topology for deduplication virtual tape library (VTL) systems. For example, within the many-to-many topologies, multiple systems may act as a disaster recovery (DR) system and move to a DR mode, the production environment may also be moved to the proper DR systems' sites. The temporary production sites may create new cartridges and/or write on old ones while still being a target for multiple other source systems. In order to allow production to move permanently to the DR sites (because production site is declared terminated for good and no replacement site is planned), "coordinated ownership synchronization" processes may occur within a replication grid at the DR sites so that ownership over source system cartridges may be changed to the DR sites (new production sites). Such processes may take place while concurrently receiving replication from other source systems. Therefore, an optimization need exists for performing these disaster recovery processes in a more effective manner, particularly during takeover operations.

In one embodiment, the mechanisms of the computer environment are configured for optimizing disaster recovery systems during takeover operations. A flag is set in a replication grid manager to identify replication grid members to consult in a reconciliation process for resolving intersecting and non-intersecting data amongst the disaster recovery systems for a takeover operation. The replication grid members are consulted for the takeover operation to accommodate a coordination of an ownership synchronization process for cartridges not distributed on-time to the replication grid members, as will be described below.

Turning now to FIG. 1, exemplary architecture 10 of data storage systems (e.g., virtual tape systems) in a computing environment is depicted. Architecture 10 provides storage services to local hosts 18 and 20, and replicate data to remote data storage systems as shown. A local storage system server 12 in communication with a storage device 14 is connected to local hosts 18 and 20 over a network including components such as Fibre channel switch 16. Fibre channel switch 16 is capable, for example, of executing commands (such as small computer systems interface (SCSI) commands) for tape devices. The skilled artisan will appreciate that architecture 10 may include a variety of storage components. For example, storage devices 14 may include conventional hard disk drive (HDD) devices, or may include solid state drive (SSD) devices.

Local storage system server 12 is connected over network 22 to a remote storage system server 24. Remote server 24 communicates with a locally connected disk storage device 26, and with locally connected hosts 30 and 32 via another network and network component 28 such as Fibre channel switch 28. Network 22 may include a variety of network topologies, such as a wide area network (WAN), a local area network (LAN), a storage area network (SAN), and other configurations. Similarly, switches 16 and 28 may include other types of network devices.

Architecture 10, as previously described, provides local storage services to local hosts, and provides replicate data to the remote data storage systems (as denoted by data replication functionality using arrow 34). As will be described, various embodiments of the present invention and claimed subject matter may be implemented on architectures such as architecture 10.

Figure 2:
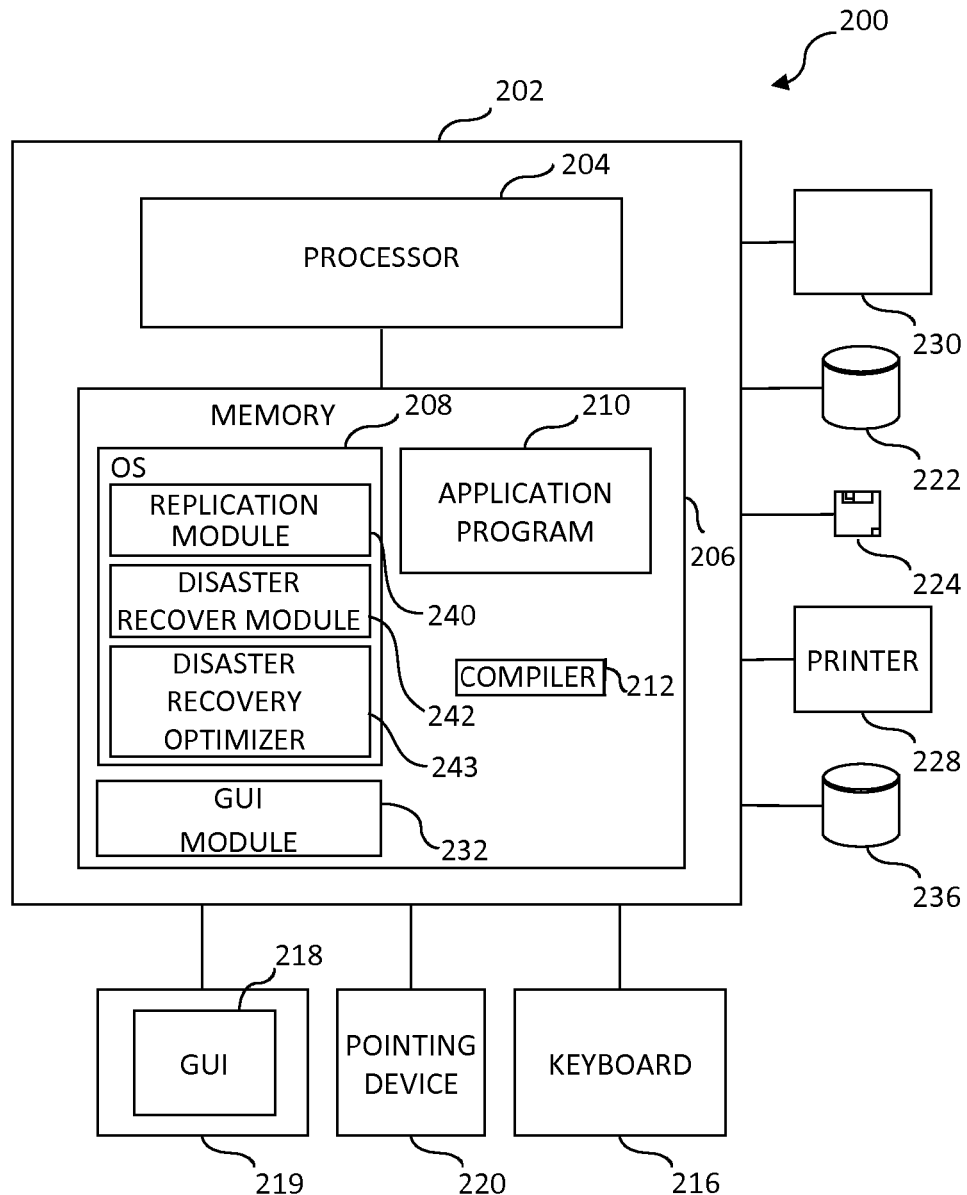
FIG. 2 illustrates an exemplary computing device including a processor device in a computing environment such as the computing environment shown in FIG. 1.

FIG. 2 illustrates a portion 200 of an exemplary computer environment that can be used to implement embodiments of the present invention. A computer 202 comprises a processor 204 and a memory 206, such as random access memory (RAM). In one embodiment, storage system server 12 (FIG. 1) may include components similar to those shown in computer 202. The computer 202 is operatively coupled to a display 219, which presents images such as windows to the user on a graphical user interface 218. The computer 202 may be coupled to other devices, such as a keyboard 216, a mouse device 220, a printer 228, etc. Of course, those skilled in the art will recognize that any combination of the above components, or any number of different components, peripherals, and other devices, may be used with the computer 202.

Generally, the computer 202 operates under control of an operating system (OS) 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. In one embodiment of the present invention, the OS 208 facilitates the backup mechanisms. Although the GUI module 232 is depicted as a separate module, the instructions performing the GUI functions can be resident or distributed in the operating system 208, the application program 210, or implemented with special purpose memory and processors. OS 208 includes a replication module 240 and discard scan module 242 which may be adapted for carrying out various processes and mechanisms in the exemplary embodiments described below, such as performing the coordinated disaster recovery production takeover operation functionality. The replication module 240 and discard scan module 242 may be implemented in hardware, firmware, or a combination of hardware and firmware. In one embodiment, replication module 240 may also be considered a "replication grid manager" for performing and/or managing the replication and change ownership activity in a replication grid's context as further described. In one embodiment, the replication module 240 and discard scan module 242 may be embodied as an application specific integrated circuit (ASIC). As the skilled artisan will appreciate, functionality associated with the replication module 240 and discard scan module 242 may also be embodied, along with the functionality associated with the processor 204, memory 206, and other components of computer 202, in a specialized ASIC known as a system on chip (SoC). Further, the functionality associated with the replication module and discard scan 242 (or again, other components of the computer 202) may be implemented as a field programmable gate array (FPGA).

As depicted in FIG. 2, the computer 202 includes a compiler 212 that allows an application program 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic that was generated using the compiler 212. The computer 202 also optionally comprises an external data communication device 230 such as a modem, satellite link, Ethernet card, wireless link or other device for communicating with other computers, e.g. via the Internet or other network.

Data storage device 222 is a direct access storage device (DASD) 222, including one or more primary volumes holding a number of datasets. DASD 222 may include a number of storage media, such as hard disk drives (HDDs), tapes, and the like. Data storage device 236 may also include a number of storage media in similar fashion to device 222. The device 236 may be designated as a backup device 236 for holding backup versions of the number of datasets primarily stored on the device 222. As the skilled artisan will appreciate, devices 222 and 236 need not be located on the same machine. Devices 222 may be located in geographically different regions, and connected by a network link such as Ethernet. Devices 222 and 236 may include one or more volumes, with a corresponding volume table of contents (VTOC) for each volume.

In one embodiment, instructions implementing the operating system 208, the computer program 210, and the compiler 212 are tangibly embodied in a computer-readable medium, e.g., data storage device 220, which may include one or more fixed or removable data storage devices 224, such as a zip drive, floppy disk, hard drive, DVD/CD-ROM, digital tape, flash memory card, solid state drive, etc., which are generically represented as the storage device 224. Further, the operating system 208 and the computer program 210 comprise instructions which, when read and executed by the computer 202, cause the computer 202 to perform the steps necessary to implement and/or use the present invention. For example, the computer program 210 may comprise instructions for implementing the grid set manager, grid manager and repository manager previously described. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention may include one or more associated software application programs 210 that include, for example, functions for managing a distributed computer system comprising a network of computing devices, such as a storage area network (SAN). Accordingly, processor 204 may comprise a storage management processor (SMP). The program 210 may operate within a single computer 202 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.)

As will be described below, the mechanisms of the illustrated embodiments provide for consulting the DR systems during a DR takeover operation in order to accommodate replica cartridges' ownership synchronization process, which was not distributed on-time to all the replication grid members. The declaration of going into DR mode may be performed by the remote systems' administrators in their own systems and is specific for the system that has gone down (or declared offline). The outcome of a DR mode is a complete blockage of all replication communication from a specific source system. In order to exit DR mode the user may choose to run a takeover operation to synchronize its ownership over the source system cartridges in coordination with other possible destinations the source may have had. Therefore, the mechanisms for consulting the DR systems (the applicable replication grid members) increase the efficiency and performance of disaster recovery takeover operations by optimizing the coordinating replica cartridges' ownership synchronization process at a remote systems while they are in a disaster recovery (DR) mode and while still being replication targets for other source systems and backup targets for local backup applications and when the remote systems that are declared to be in the DR mode may have become part of a disaster recovery system(s).

Additional embodiments seek to optimize disaster recovery systems during takeover operations. In one embodiment, by way of example only, a flag may be set in a replication grid manager to identify replication grid members to consult in a reconciliation process for resolving intersecting and non-intersecting data amongst a data storage systems for a takeover operation. The replication grid members may be consulted for the takeover operation to accommodate a coordination of an ownership synchronization process for cartridges not distributed on-time to the replication grid members. Thus, the mechanisms of the present invention optimize the ability to provide an inherent and coordinated synchronization process for a virtual tape (VT) system in order to restore a replication group state to its original state prior to a disaster, thereby allowing seamless production site switching to a number of disaster recovery (DR) sites, which include replicas baseline. Also, synchronization mechanisms may work in parallel to normal replication in order to provide a DR capability to a single or a set of source systems while allowing the rest of to keep replicating normally. It should be noted that the disaster recovery systems and may be referred to as replication grid members, DR systems, and/or remote systems. Replication grid members may include disaster recovery systems, remote systems, source systems, source systems that are offline, and/or any data storage system(s) that reside in the same replication grid. Such terms may be used throughout the description without any intended limitation.

Figure 3:
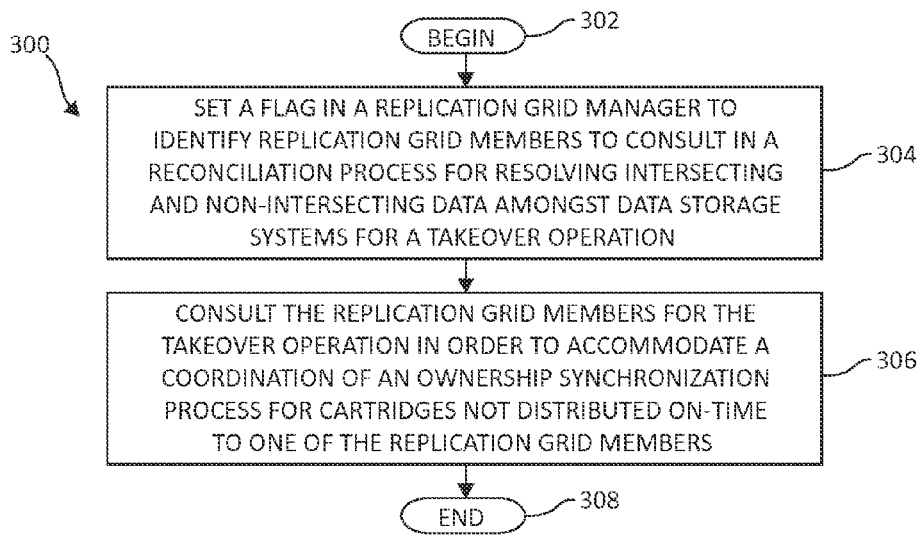
FIG. 3 illustrates an exemplary method for optimizing disaster recovery systems during takeover operations in many-to-many topology in which aspects of the present invention may be implemented.

FIG. 3 is a flow chart illustrating an exemplary method 300 for optimizing disaster recovery systems during takeover operations in a many-to-many topology within a computing environment. The method 300 begins (step 302) by setting a flag in a replication grid manager to identify replication grid members to consult in a reconciliation process for resolving intersecting and non-intersecting data amongst data storage systems for a takeover operation (step 304). The replication grid members are consulted for the takeover operation in order to accommodate a coordination of an ownership synchronization process for cartridges not distributed on-time to one of the replication grid members (step 306). The consulting may be performed during the takeover operation. The method 300 ends (step 308).

As previously mentioned, the setting of a flag in a replication grid manager allows the mechanisms of the present invention to identify replication grid members to consult in a reconciliation process for resolving intersecting and non-intersecting data amongst data storage systems for a takeover operation. Since ownership of cartridges may be passed and/or acquired by a replication grid member prior to a source system going down or declared offline, the flag may be written and stored in the replication grid prior to a declaration of a disaster recovery mode and/or before the source system goes offline. Thus, the replication grid members may be consulted before or after a source system goes offline for performing a takeover operation in order to accommodate a coordination of an ownership synchronization process for cartridges not distributed on-time to one of the replication grid members, particularly since ownership may be acquired anytime, as will be describe below.

Figure 4:
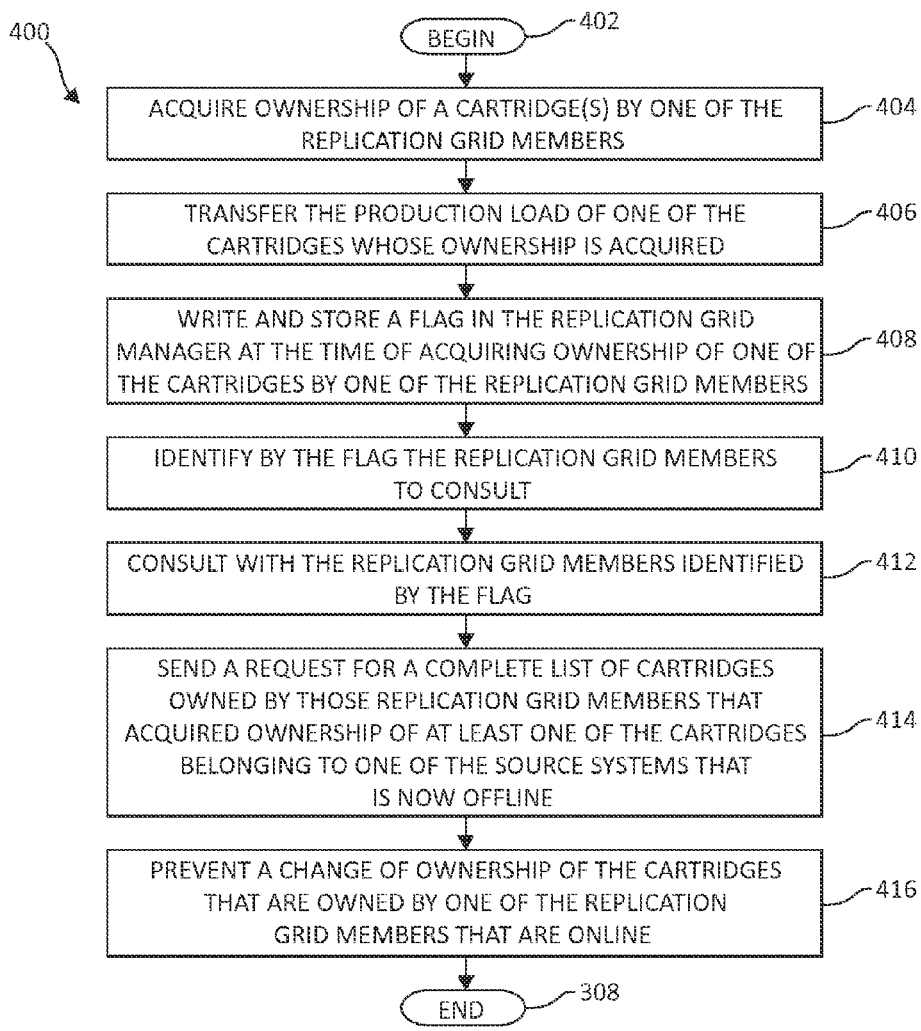
FIG. 4 illustrates an exemplary method for setting a flag to identify replication grid members to consult in a reconciliation process in which aspects of the present invention may be implemented.

Turning to FIG. 4, a flow chart diagram illustrating an exemplary method 400 for setting a flag to identify replication grid members to consult in a reconciliation process is shown. The method 400 commences (step 402) by acquiring ownership of a cartridge(s) by one of the replication grid members (step 404). The production load of the acquired cartridge(s) is transferred (step 406). For example, the production load of a cartridge belonging to a source system, prior to going offline, is transferred to the replication grid member that acquired ownership of the cartridge. A flag is written and persistently stored in the replication grid manager at the time of acquiring ownership of one of the cartridges by one of the replication grid members (step 408). The method 400 will identify with the flag the replication grid members needed to consult (step 410). The replication grid members that may be consulted are those replication grid members that acquired ownership over at least one of the cartridges belonging to one of the source systems that is now offline. The method 400 will consult with the replication grid members identified by the flag in the replication grid (step 412) by sending a request for a complete list of the cartridges owned by those replication grid members that acquired ownership of at least one of the cartridges belonging to one of the source systems that is now offline (step 414). A change of ownership of the cartridges, which are owned by one of the replication grid members that are online, is prevented (step 416). The method 400 ends (step 418).

Figure 5:
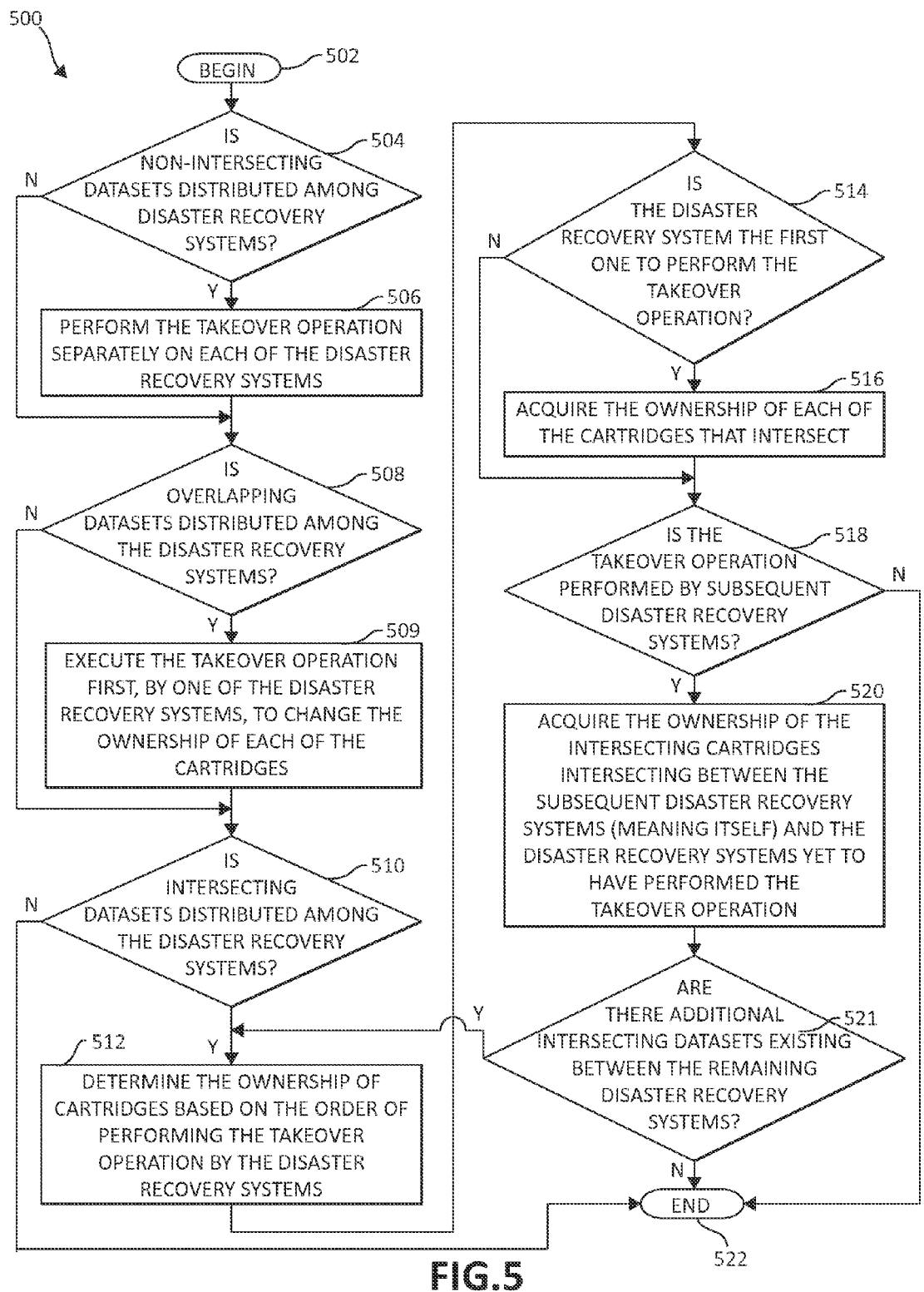
FIG. 5 illustrates an exemplary method for coordinating an ownership synchronization process for replica cartridges via the reconciliation process.

By setting the flag in the replication to identify the replication grid members to consult in a reconciliation process, the reconciliation process for resolving both intersecting and non-intersecting data among multiple data systems for takeover operations are optimized for increased efficiency and performance. Moreover, the coordinating an ownership synchronization process for replica cartridges via the reconciliation process is enhanced with increased efficiency by consulting the replication grid members for the takeover operation to accommodate a coordination of an ownership synchronization process for a plurality of cartridges not distributed on-time to the replication grid members Turning first to FIG. 5, a flow chart diagram of exemplary coordinating of an ownership synchronization process for replica cartridges via the reconciliation process is illustrated as method 500. The method 500 begins (step 502) and determines if non-intersecting datasets are distributed among disaster recovery systems (step 504). If yes, the method 500 will perform the takeover operation separately on each of the disaster recovery systems (step 506). If no, the method 500 will determine if overlapping datasets are distributed among the disaster recovery systems (step 508). If yes, the method 500 will execute the takeover operation first by one of the disaster recovery systems to change the ownership of each of the cartridges (step 509). If no, the method 500 will determine if intersecting datasets are distributed among the disaster recovery systems (step 510). If no, the method will end (step 522). If yes, the method will determine the ownership of cartridges based on the order of performing the takeover operation by the plurality of disaster recovery systems (step 512). For determining ownership of the cartridges based on the order of performing the takeover operation by the plurality of disaster recovery systems, the method 500 will determine if one of the plurality of disaster recovery systems is the first to perform the takeover operation (step 514). If yes, the method 500 will acquire the ownership of each of the cartridges that intersect (step 516). If no, the method 500 will determine if the disaster recovery system(s) is a subsequent disaster recovery system(s) to perform the takeover operation (step 518). If no, the method 500 will end (step 522). If yes, the method 500 will acquire the ownership of the intersecting cartridges intersecting between the subsequent performing disaster recovery systems that is performing the takeover operation (meaning itself) and the disaster recovery systems yet to have performed the takeover operation (step 520). For example, there may be four disaster recovery systems in a grid so the method 500 may perform the takeover operation on the first disaster recovery system, as mentioned above, and then perform the takeover operations for the subsequent disaster recovery systems. The takeover operations may be iteratively performed for the first, second, third, and fourth disaster recovery system, depending on which datasets are intersecting. The method 500 will check and determine if there are additional intersecting datasets existing between the remaining disaster recovery systems (step 521) (this algorithm may converge to the disjointed form). If yes, the method 500 will return and determine the ownership of cartridges based on the order of performing the takeover operation by the plurality of disaster recovery systems (step 512) and repeat the subsequent steps, as mentioned above. If no, the method 500 ends (step 522).

Figure 6:
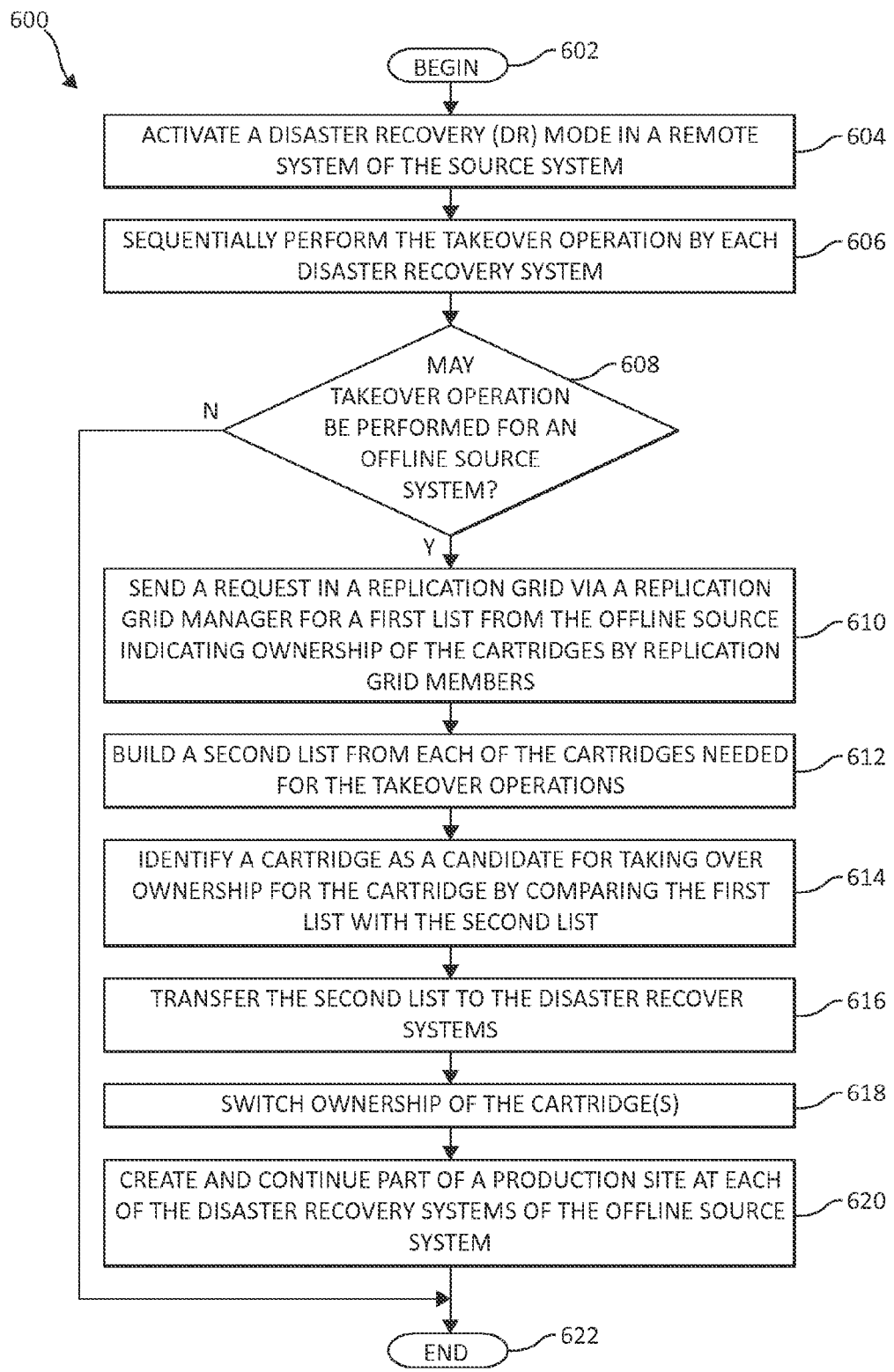
FIG. 6 illustrates an exemplary method for performing a reconciliation process amongst data storage systems for a takeover operation.

Turning to FIG. 6, a flow chart diagram of an exemplary method 600 for a reconciliation process amongst data storage systems for a takeover operation is illustrated. The method 600 begins (step 602) by activating a disaster recovery (DR) mode in a remote system of the source system (step 604). The disaster recovery system is allowed to sequentially perform the takeover operation (step 606). The disaster recover system may each take a turn to perform the takeover operation. The method 600 will determine if the takeover operation may be performed for an offline source system (step 608). A request is sent in a replication grid via a replication grid manager for a first list from the offline source system indicating ownership of the cartridges by replication grid members (step 610). A second list is built from each of the cartridges needed for the takeover operations (step 612). A cartridge is identified as a candidate for taking over ownership of the cartridge by comparing the first list with the second list, (step 614). The second list is transferred to the disaster recover systems (step 616). Ownership of the cartridge(s) is switched (step 618). The method 600 will create and continue part of a production site at each of the disaster recovery systems of the offline source system (step 620). The method 600 ends (step 622).

In one embodiment, the DR mode may be activated at each of the DR systems for a source system. The DR mode may be entered in order to protect replicas (cartridges/data) and in order to allow takeover operation. Each remote user (disaster recovery systems) may choose to sequentially run (e.g., run the takeover process in turn) the takeover operation. The mechanisms check if the takeover operation may be run for a specific chosen source system. The DR systems check that the source system is announced offline. The mechanisms sends a request in the replication grid via Replication Grid Manager asking for a list of cartridges from the offline source that are already owned by a different replication gird member. The Replication Grid Manager requests from each replication grid member that has obtained ownership over the offline source's cartridges to send a list of the replication grid members own list of owned cartridges (data). The replication grid manager builds a single list and transfers the list to the DR system(s). The mechanisms build a list of all the cartridges needed for takeover. The needed cartridges may have an ownership stamp from the offline source. The mechanisms compare the lists and identify the specific cartridges that are candidates for ownership takeover. The mechanisms switches ownership of all candidate cartridges to the specific DR systems and the switching may be performed iteratively and asynchronously. The source system's production site is partially created and continued at each DR site according to the specific cartridges being taken over. The allowing each remote user to choose to run the takeover operation in turn and the partially creating and continuing at each DR site may be performed iteratively and/or in parallel for each remote DR system, particularly where the order of execution of the grid's cartridge list creation operation is the decisive factor for which DR system gets ownership of which cartridges and also depending on the intersection of datasets between different DR systems.

Figure 7:
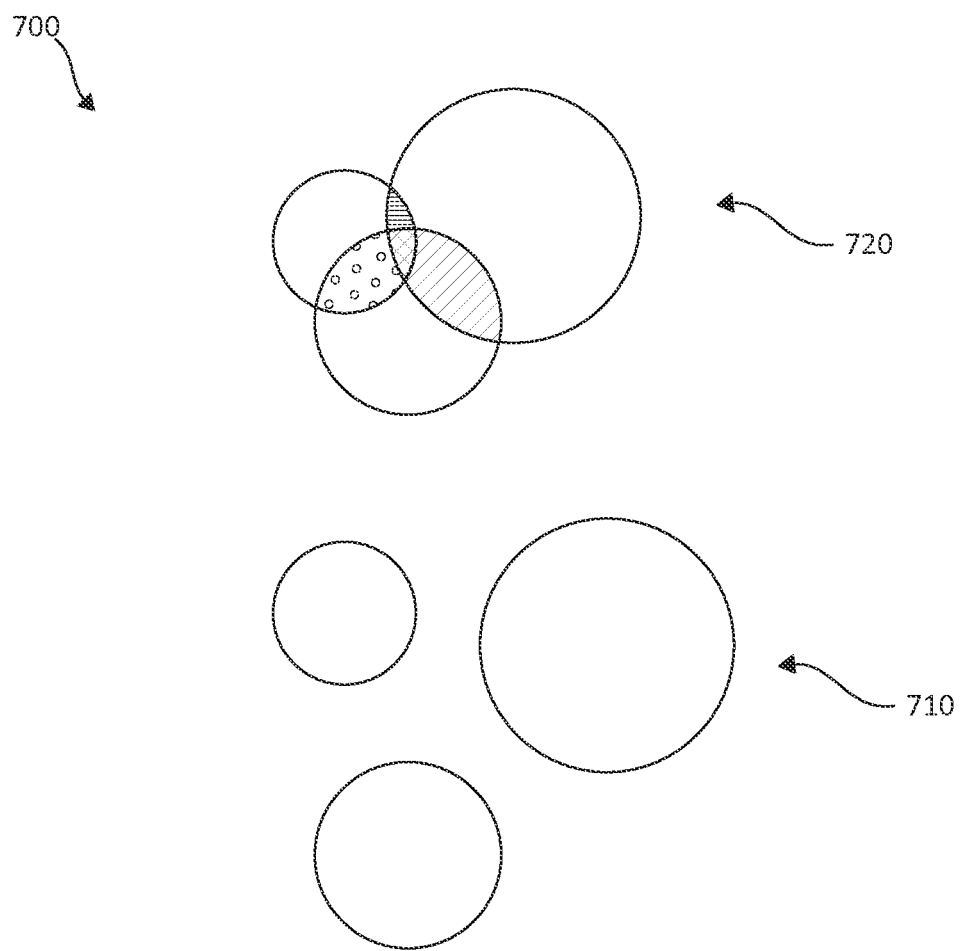
FIG. 7 illustrates an exemplary block diagram of the types of mutuality between source data sets distributed to different remote systems.

FIG. 7 is an exemplary block diagram 700 of the type of mutuality between source data sets distributed to different remote systems. When dealing with disjointed datasets 720 distributed over to different DR systems, the takeover operations may be performed separately on each system with no existing danger to the data. When dealing with completely overlapping datasets distributed over to different DR systems, the first takeover operation in any of the DR systems may result in changing cartridge ownership for all the cartridges, so that subsequent takeover operations from other DR systems will return without any results. When dealing with intersecting datasets 710 distributed over to different DR systems, the order of the takeover operation determines which of the different DR system acquires ownership of the cartridges. For example, the first DR system running takeover will acquire ownership of the intersecting cartridges for all the DR systems and also acquire ownership of the first DR system running takeover's unique cartridges. The second DR system running takeover will acquire ownership of the intersecting cartridges between itself (the second DR system running takeover) and DR systems, which have not yet run the takeover operation. Such operations may be performed until no intersecting datasets exists between the remaining DR systems. (The calculations/algorithm may then converge to the disjoint form. Each remote user (disaster recovery systems) exits DR mode for the specific source system.

To illustrate the performing the consulting with the plurality of replication grid members during a disaster recovery takeover operation in order to accommodate replica cartridges' ownership synchronization process, which was not distributed on-time to all the replication grid member, the following figures serve to illustrate the solutions provided by the mechanisms of the present invention. To illustrate such optimization in a replication data storage disaster recovery environment, FIG. 8A is an exemplary diagram 800 illustrating four systems replicating to each other wherein system #3 suffers failure before replicating.

Figure 8A:
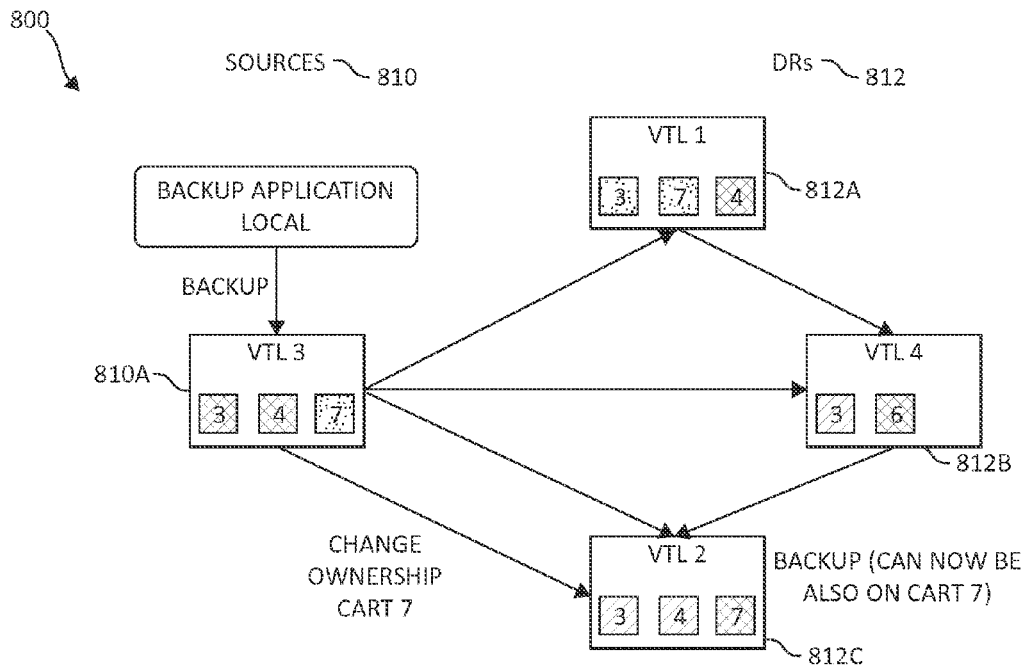
FIG. 8A illustrates an exemplary block diagram of many-to-many system (four systems) for replication with system #3 being a source system and replicating to all other remote systems.
Figure 8B:
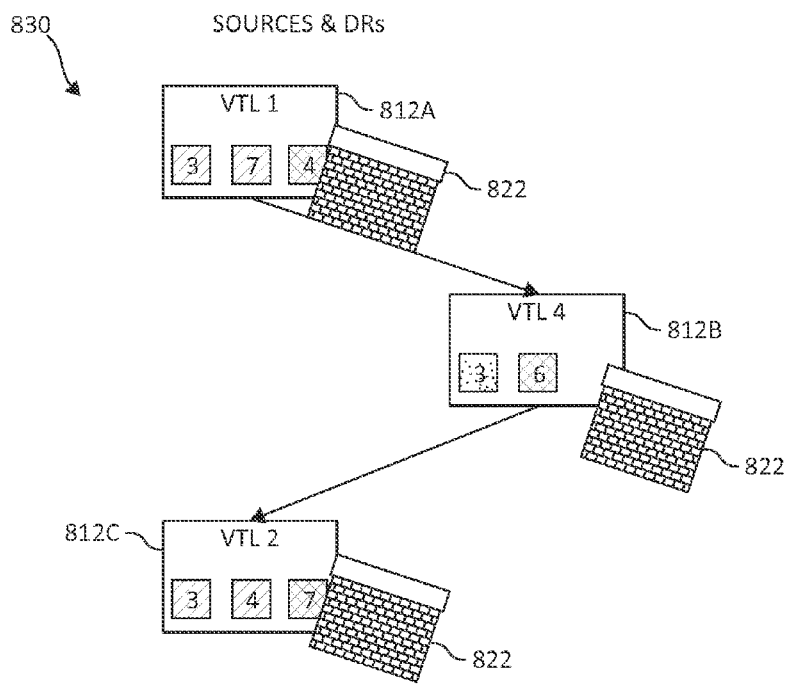
FIG. 8B illustrates an exemplary block diagram with the source system #3 810A no longer available.

In FIG. 8A, a many-to-many system (four systems) for replication is illustrated with system #3 810A being a source system 810 replicating to all other systems (shown in FIG. 8 as 810A). System #3 contains three cartridges for replicating, cartridge 3, 4, and 7. System #3 810A changed ownership of cartridge 7 to DR system #2 (which can now backup on it) by doing an operation only between the 2 systems involved). Cartridge 3 has passed/replicated from the source system 810A fully to all of the disaster recovery (DR) systems 812 (shown in FIG. 8 as 812A, 812B, and 812C) within the many-to-many systems. Cartridge 7 completely passed from the source system #3 810A to the disaster recovery system #1 (still thinking #3 is the owner) and disaster recovery system #2 (new owner). Moreover, cartridge 4 was replicated only to disaster recovery system #2. The remote systems (disaster recovery systems) working as production sites have now created cartridges 6 and 4 seen with the darker shading.

FIG. 810B is an exemplary diagram 830 illustrating the source system #3 810A as no longer available (e.g., offline). All remote systems' users are in DR mode for source system #3 810A and therefore may not receive replication from source system #3 810A as illustrated by the blocks 822. The other available source systems continue working normally and the DR systems keep backing up local data. The DR state on source #3 810A is only temporary. If the DR mode is cancelled without performing the takeover operation ownership synchronization of the some/all cartridges when moving production may be lost. The darker shaded cartridges (or X shaped lines as seen in 812A-C) indicate the ownership of the cartridges within the systems. The lighter shaded cartridges (or cartridges shown with diagonal lines or speckled dots) indicate only replica cartridges.

Figure 8C:
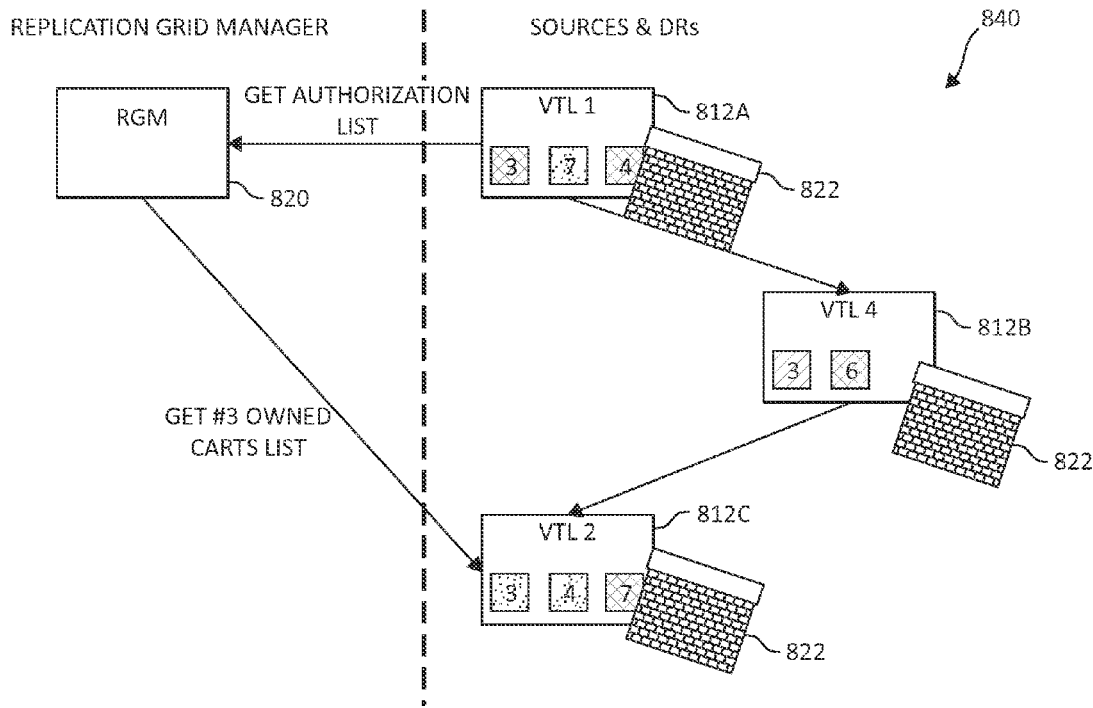
FIG. 8C illustrates an exemplary block diagram demonstrating the takeover operation performed by the first DR system #1 and consulting DR system #2.

FIG. 8C is an exemplary diagram 840 illustrating the takeover operation performed by the first DR system #1 812A and consulting DR system #2. All remote systems' users are in DR mode for source system #3 810A and therefore may not receive replication from source system #3 810A as illustrated by the blocks 822. The DR system #1 requests a list of available cartridges for takeover operations from the replication grid manager 820. The replication grid manager 820 consults with the DR system #2 since the replication grid manager 820 has knowledge that DR system #2 previously acquire/gained ownership of some cartridges from the source system #3. The replication grid manager 820 receives a list of all of source system #3's cartridges that are owned by other DR systems (in the present case ownership had changed in a user operation to DR system #2). Cartridges 7 will not change ownership since it is already owned by an online DR system. Cartridge 3 will change ownership to the DR system #1 812A after checking source system #3 810A cartridges are still owned by the source 810A and not another DR system.

Figure 8D:
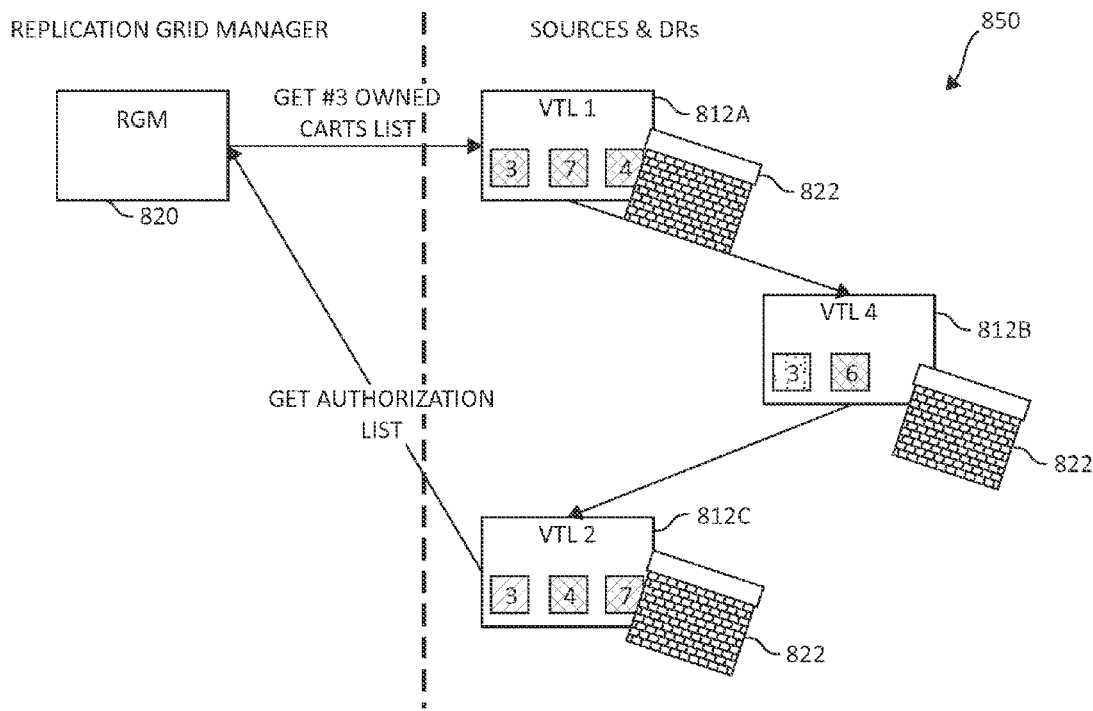
FIG. 8D illustrates an exemplary block diagram demonstrating the takeover operation performed by the second DR system #2.

FIG. 8D is an exemplary diagram 850 illustrating the takeover operation performed by the second DR system #2 812C. All remote systems' users are in DR mode for source system #3 810A and therefore may not receive replication from source system #3 810A as illustrated by the blocks 822. DR system #2 812C requests a list of available cartridges for takeover from the Replication Grid Manager 820. The replication grid manager 820 consults and retrieves a list of all of source system #3's "owned by others" cartridges (in this case ownership had changed only in the first takeover operation to DR system #1). Cartridges 3 will not change ownership since it is already owned by an online system in the grid. Cartridge 4 will change ownership to DR system #2 812C.

Figure 8E:
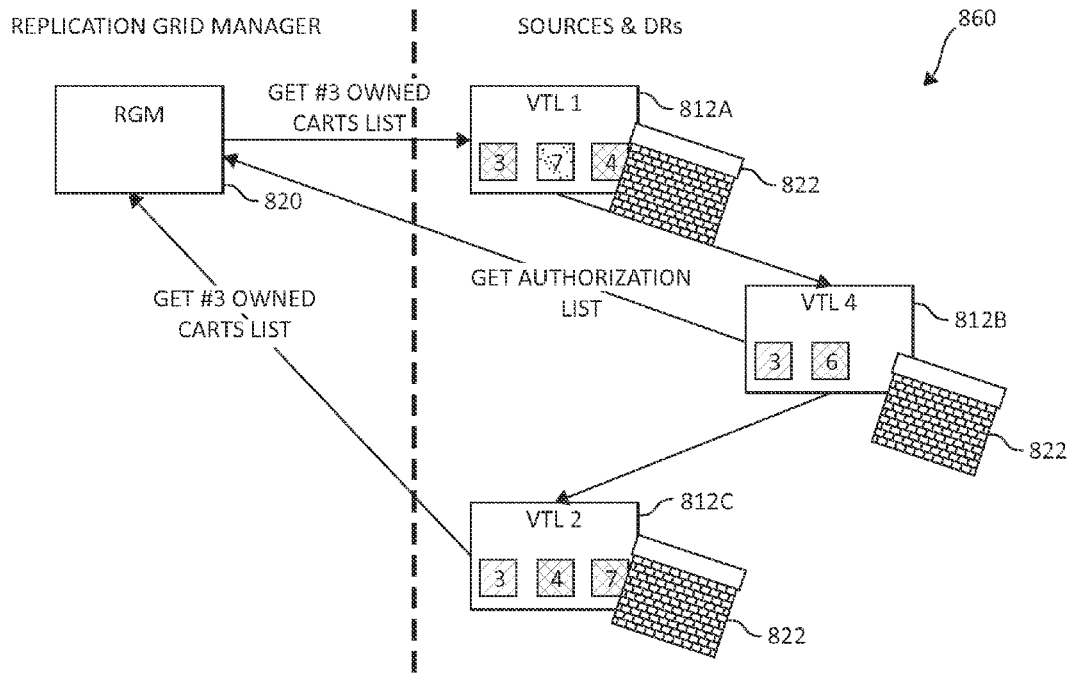
FIG. 8E illustrates an exemplary block diagram demonstrating the takeover operation performed by the second DR system #4.

FIG. 8E is an exemplary diagram 860 illustrating the takeover operation performed by the second DR system #4 812B. All remote systems' users are in DR mode for source system #3 810A and therefore may not receive replication from source system #3 810A as illustrated by the blocks 822. The DR system #4 812B requests a list of available cartridges for takeover from the replication grid manager 820. The replication grid manager 820 consults and retrieves a list of all of source system #3's 810A "owned by others" cartridges (in this case ownership had changed only in the first and second takeover operations to DR systems #1 812A and #2 812C). Cartridges 3 will not change ownership since it is already owned by an online system in the grid. No further operation will be pursued.

Figure 8F:
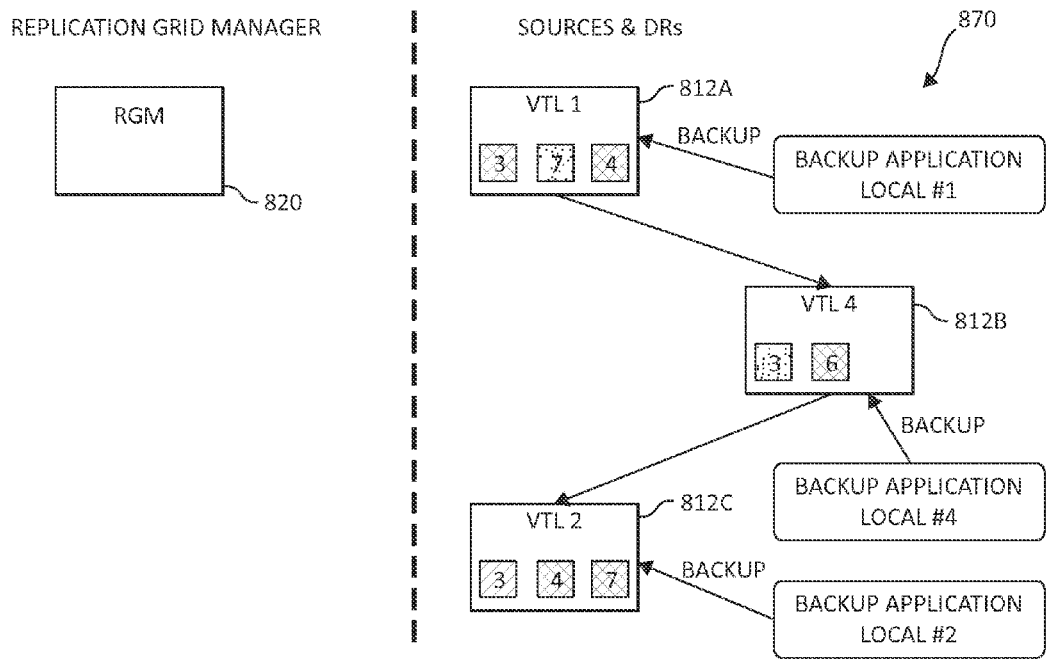
FIG. 8F illustrates an exemplary block diagram demonstrating each of the DR systems exiting the DR mode and continuing to work as normal.

FIG. 8F is an exemplary diagram 870 illustrating each of the DR systems (812A-812C) exiting the DR mode and continuing to work as normal. All remote systems' users are in DR mode for source system #3 810A and therefore may not receive replication from source system #3 810A as illustrated by the blocks 822. Each of the DR systems (812A-812C) continue to work as normal with each of its production data backed up on the respective DR systems (812A-812C), which may contain data of the newly owned cartridges).

Figure 9:
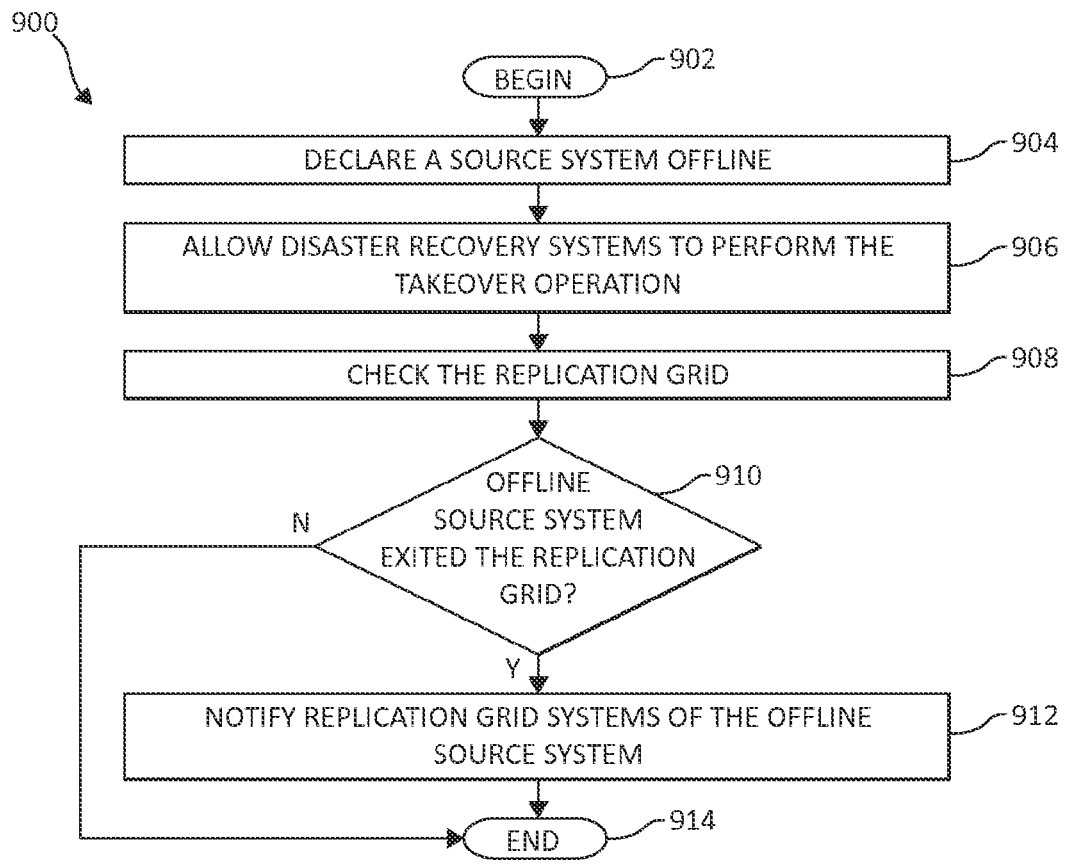
FIG. 9 illustrates a flowchart illustrating an exemplary method for announcing a system offline.

Turning to FIG. 9, flowchart illustrating an exemplary method 900 for announcing a system offline. The method commences (step 902) by declaring a source system offline (step 904). Disaster recovery systems are allowed to perform the takeover operation (step 906). A replication grid is checked (step 908). The method 900 determines if the offline source system has exited the replication grid, (step 910). Replication grid systems are notified of the offline source system (step 912). The method 900 ends (step 914).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for optimizing disaster recovery systems during takeover operations by a processor device in a computing storage environment, the method comprising:
    setting a flag in a replication grid manager to identify a plurality of replication grid members to consult in a reconciliation process for resolving intersecting and non-intersecting data amongst a plurality of data storage systems for a takeover operation, including indicating Those of the plurality of replication grid members that acquired ownership over at least one of a plurality of cartridges belonging to one of a plurality of source systems.

2. The method of claim 1, further comprising performing the consulting with the plurality of replication grid members for the takeover operation to accommodate a coordination of an ownership synchronization process for a plurality of cartridges not initially distributed to at least one of the plurality of replication grid members.

3. The method of claim 1, further including acquiring ownership of at least one of the plurality of cartridges by the at least one of the plurality of replication grid members, wherein a production load of the at least one of the plurality of cartridges is transferred.

4. The method of claim 3, further including writing and persistently storing the flag in the replication grid manager, the writing and storing the flag occurring at the time of acquiring ownership of at least one of the plurality of cartridges by the at least one of the plurality of replication grid members.

5. The method of claim 1, wherein the consulting includes sending a request for a complete list of the plurality of cartridges owned by the plurality of replication grid members that acquired ownership of at least one of a plurality of cartridges belonging to one of a plurality of source systems.

6. The method of claim 1, wherein the consulting is performed prior to the takeover operation.

7. The method of claim 1, wherein the coordination of the ownership synchronization process includes preventing a change of ownership of the plurality of cartridges that are owned by those of the plurality of replication grid members online.

* * * * *